United States Patent
Harmer et al.

(10) Patent No.: US 7,402,711 B2
(45) Date of Patent: Jul. 22, 2008

(54) PREPARATION OF POLY(TETRAMETHYLENE) GLYCOL

(75) Inventors: Mark Andrew Harmer, Kennett Square, PA (US); Christopher P. Junk, Wilmington, DE (US); Leo Ernest Manzer, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 118 days.

(21) Appl. No.: 11/525,412

(22) Filed: Sep. 22, 2006

(65) Prior Publication Data

US 2007/0066853 A1    Mar. 22, 2007

Related U.S. Application Data

(60) Provisional application No. 60/719,633, filed on Sep. 22, 2005.

(51) Int. Cl.
*C07C 41/02* (2006.01)
*C07D 207/12* (2006.01)

(52) U.S. Cl. .................................................. 568/617
(58) Field of Classification Search .................. None
See application file for complete search history.

(56) References Cited

U.S. PATENT DOCUMENTS

| 5,262,562 | A | 11/1993 | Hollingsworth et al. |
| 5,541,346 | A | 7/1996 | Drysdale et al. |
| 5,608,105 | A | 3/1997 | Fitzpatrick |
| 5,859,263 | A | 1/1999 | Ghorpade et al. |
| 6,054,611 | A | 4/2000 | Farone et al. |
| 2003/0233011 | A1 | 12/2003 | Fagan et al. |

FOREIGN PATENT DOCUMENTS

WO    WO 03/048078 A2    6/2003

*Primary Examiner*—Rosalynd Keys

(57) ABSTRACT

This invention relates to a process comprising using ionic liquids for preparing poly(tetramethylene)glycol from tetrahydrofuran.

13 Claims, No Drawings

PREPARATION OF POLY(TETRAMETHYLENE) GLYCOL

CROSS-REFERENCE TO RELATED APPLICATION

This application claims priority under 35 U.S.C. §119 from U.S. Provisional Application Ser. No. 60/719,633, filed Sep. 22, 2005.

FIELD OF INVENTION

This invention relates to a method for preparing poly(tetramethylene)glycol.

BACKGROUND

Tetrahydrofuran (THF) is polymerized to poly(tetramethylene ether)glycol which is useful in the preparation of Spandex fibers; polyurethane resins which are useful in elastomeric parts; and thermoplastic elastomers which are useful for molding various mechanical parts.

U.S. Pat. No. 5,541,346 describes a process for polymerizing cyclic ethers, including tetrahydrofurans, to linear polyethers by contacting the cyclic ethers with a metal catalyst and accelerator at elevated temperature. U.S. Pat. No. 5,262,562 describes a method for the production of polyether glycol by polymerizing tetrahydrofuran.

The present invention provides an improved process for the production of poly(tetramethylene)glycol in the presence of at least one ionic liquid.

SUMMARY OF THE INVENTION

The present invention relates to a process for preparing poly(tetramethylene)glycol comprising:

A) forming a reaction mixture comprising (1) tetrahydrofuran, (2) at least one catalyst, (3) at least one accelerator and (4) at least one ionic liquid comprised of an ammonium cation and an anion having the Formula:

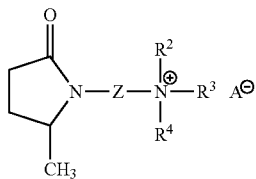

wherein:
(i) Z is $-(CH_2)_n-$, wherein n is an integer from 2 to 12;
(ii) $R^2$, $R^3$ and $R^4$ taken independently are H, $-CH_3$, $-CH_2CH_3$ or $C_3$ to $C_6$ straight-chain or branched monovalent alkyl; and
(iii) $A^-$ is $R^5-SO_3^-$ or $(R^6-SO_2)_2N^-$; wherein $R^5$ and $R^6$ are independently selected from the group consisting of:
  (a) $-CH_3$, $-C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
  (b) $-CH_3$, $-C_2H_5$, or $C_3$ to $C_{25}$ straight-chain, branched or cyclic alkane or alkene comprising one to three heteroatoms selected from the group consisting of O, N and S, and optionally substituted with at least one member selected from the group consisting of Cl, Br, F, I, OH, $NH_2$ and SH;
  (c) $C_6$ to $C_{25}$ unsubstituted aryl or unsubstituted heteroaryl having one to three heteroatoms independently selected from the group consisting of O, N and S; and
  (d) $C_6$ to $C_{25}$ substituted aryl or substituted heteroaryl having one to three heteroatoms independently selected from the group consisting of O, N and S; and wherein said substituted aryl or substituted heteroaryl has one to three substituents independently selected from the group consisting of:
    (1) $-CH_3$, $-C_2H_5$, or $C_3$ to $C_{25}$ straight-chain, branched or cyclic alkane or alkene, optionally substituted with at least one member selected from the group consisting of Cl, Br, F, I, OH, $NH_2$ and SH,
    (2) OH,
    (3) $NH_2$, and
    (4) SH;

at a temperature of from about 0 degrees C. to about 75 degrees C.; thereby forming a polyether glycol phase comprising poly(tetramethylene)glycol and an ionic liquid phase that comprises at least one catalyst; and B) separating the polyether glycol phase from the ionic liquid phase comprising the at least one catalyst, thereby forming a separated ionic liquid phase.

DETAILED DESCRIPTION OF THE INVENTION

The present invention relates to a process for the polymerization of tetrahydrofuran, wherein an ionic liquid is used to allow for ready separation of the polymerized product from the catalyst.

In this disclosure a number of terms and abbreviations are used. The following definitions are provided.

By "ionic liquid" is meant organic salts that are fluid around or below 100 degrees C.

By "fluoroalkyl" is meant an alkyl group wherein at least one member selected from the hydrogens has been replaced by fluorine. By "perfluoroalkyl" is meant an alkyl group wherein all of the hydrogens have been replaced by fluorines.

By "alkoxy" is meant a straight-chain or branched alkyl group bound via an oxygen atom. By "fluoroalkoxy" is meant an alkoxy group wherein at least one member selected from the hydrogens has been replaced by fluorine. By "perfluoroalkoxy" is meant an alkoxy group wherein all of the hydrogens have been replaced by fluorines.

By "halogen" is meant bromine, iodine, chlorine or fluorine.

By "heteroaryl" is meant an aryl group having one or more heteroatoms.

By "catalyst" is meant a substance that affects the rate of the reaction but not the reaction equilibrium, and emerges from the process chemically unchanged.

By "homogeneous acid catalyst" or "homogeneous catalyst" is meant a catalyst that is molecularly dispersed with the reactants in the same phase.

By tetrahydrofuran is meant a compound having the Formula:

When referring to an alkane, alkene, alkoxy, fluoroalkoxy, perfluoroalkoxy, fluoroalkyl, perfluoroalkyl, aryl or heteroaryl, the term "optionally substituted with at least one member selected from the group consisting of" means that one or more hydrogens on the carbon chain may be independently substituted with one or more of at least one member of the group. For example, substituted $C_2H_5$ may be, without limitations, $CF_2CF_3$, $CH_2CH_2OH$ or $CF_2CF_2I$.

This invention is directed to a process for the preparation of poly(tetramethylene) glycol comprising:

A) forming a reaction mixture comprising (1) tetrahydrofuran, (2) at least one catalyst, (3) at least one accelerator and (4) at least one ionic liquid having an ammonium cation and an anion of the Formula:

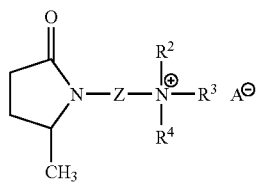

wherein:
(i) Z is —$(CH_2)_n$—, wherein n is an integer from 2 to 12;
(ii) $R^2$, $R^3$ and $R^4$ taken independently are H, —$CH_3$, —$CH_2CH_3$ or $C_3$ to $C_6$ straight-chain or branched monovalent alkyl; and
(iii) $A^-$ is $R^5$—$SO_3^-$ or $(R^6$—$SO_2)_2N^-$; wherein $R^5$ and $R^6$ are independently selected from the group consisting of:
  (a) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
  (b) —$CH_3$, —$C_2H_5$, or $C_3$ to $C_{25}$ straight-chain, branched or cyclic alkane or alkene comprising one to three heteroatoms selected from the group consisting of O, N and S, and optionally substituted with at least one member selected from the group consisting of Cl, Br, F, I, OH, $NH_2$ and SH;
  (c) $C_6$ to $C_{25}$ unsubstituted aryl or unsubstituted heteroaryl having one to three heteroatoms independently selected from the group consisting of O, N and S; and
  (d) $C_6$ to $C_{25}$ substituted aryl or substituted heteroaryl having one to three heteroatoms independently selected from the group consisting of O, N and S; and wherein said substituted aryl or substituted heteroaryl has one to three substituents independently selected from the group consisting of:
    (1) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH,
    (2) OH,
    (3) $NH_2$, and
    (4) SH;
at a temperature of from about 0 degrees C. to about 75 degrees C.; thereby forming a polyether glycol phase comprising poly(tetramethylene)glycol and an ionic liquid phase that comprises at least one catalyst; and B) separating the polyether glycol phase from the ionic liquid phase comprising the at least one catalyst, thereby forming a separated ionic liquid phase.

In a more specific embodiment, $A^-$ is selected from the group consisting of $[CH_3OSO_3]^-$, $[C_2H_5OSO_3]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, and $[(CF_2HCF_2SO_2)_2N]^-$, $[(CF_3CFHCF_2SO_2)_2N]^-$.

In one more specific embodiment, n of the ionic liquid is from 2 to 6.

The polymerization reaction is performed in the presence of an accelerator. Suitable accelerators are carboxylic anhydrides, acyl halides, and carboxylic acids with a $pK_a$ of less than about 6 in water. The accelerator is added at a concentration of from about 0.1% to about 10% by weight of the tetrahydrofuran plus the accelerator.

By a carboxylic anhydride is meant a compound containing the grouping —C(O)O(O)C—, wherein the free valencies are to other carbon atoms. A preferred carboxylic anhydride is an anhydride of an alkyl carboxylic acid or a halogen substituted alkyl carboxylic acid; in one embodiment the carboxylic anhydride is acetic anhydride or trifluoroacetic anhydride.

By an acyl halide is meant a compound containing the grouping —C(O)X, where X is chlorine or bromine and the free valence is to another carbon atom. In preferred acyl halides, X is chlorine. In preferred embodiments, the acyl halides are alkyl acyl halides, such as acetyl halides. In one embodiment, the acyl halide is acetyl chloride.

By a carboxylic acid is meant a compound containing the grouping —C(O)OH, wherein the free valence is to another carbon atom. Preferred carboxylic acids have a $pK_a$ of less than 5 in water. Useful carboxylic acids include, but are not limited to acetic acid, trifluoroacetic acid, chloroacetic acid, benzoic acid, trichloroacetic acid, p-nitrobenzoic acid, butyric acid, formic acid, cyanoacetic acid, nitropropionic acid, acrylic acid, methacrylic acid, and napthoic acid. In one embodiment of the invention, the carboxylic acid is selected from the group consisting of trifluoroacetic acid, acetic acid, formic acid, cyanoacetic acid, nitropropionic acid, acrylic acid and methacrylic acid.

An important consideration in the preparation of polyethers is the number average molecular weight (Mn) of the polyether and its molecular weight distribution. When the polyether is to be used as a monomer in the preparation of another polymer (usually in the diol form), it is often preferred that the Mn of the polyether be in the range of about 400 to about 20,000, preferably about 500 to about 5,000.

The at least one catalyst is a homogeneous acid catalyst. In one embodiment of the invention, suitable homogeneous acid catalysts are those having a pKa of less than about 4; in another embodiment, suitable homogeneous acid catalysts are those having a pKa of less than about 2.

Suitable catalysts include inorganic acids, organic sulfonic acids, heteropolyacids, fluoroalkyl sulfonic acids, metal sulfonates, metal trifluoroacetates, compounds thereof and combinations thereof. Examples of catalysts include sulfuric acid, fluorosulfonic acid, p-toluenesulfonic acid, phosphotungstic acid, phosphomolybdic acid, trifluoromethanesulfonic acid, nonafluorobutanesulfonic acid, 1,1,2,2-tetrafluoroethanesulfonic acid, 1,1,2,3,3,3-hexafluoropropanesulfonic acid, bismuth triflate, yttrium triflate, ytterbium triflate, neodymium triflate, lanthanum triflate, scandium triflate, and zirconium triflate.

The catalyst is used at a concentration from about 0.1% to about 20% by weight of the tetrahydrofuran reactant. In one embodiment the catalyst is used at a concentration from about 0.1% to about 10%. In still another embodiment, the catalyst is used at a concentration from about 0.1% to about 5%.

The ionic liquid useful for the invention may be synthesized from a pyrrolidine-2-one of the Formula:

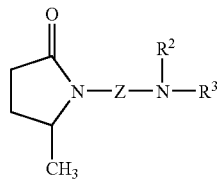

wherein:
(i) Z is —(CH$_2$)$_n$—, wherein n is an integer from 2 to 12; and
(ii) R$^2$ and R$^3$ taken independently are H, —CH$_3$, —CH$_2$CH$_3$ or C$_3$ to C$_6$ straight-chain or branched monovalent alkyl.

Synthesis of N-hydrocarbyl Pyrrolidine-2-one

The pyrrolidine-2-one may be synthesized by contacting levulinic acid or an ester thereof with a diamine of the Formula R$^2$R$^3$N-Z-NH$_2$ in the presence of hydrogen gas and a catalyst according to Reaction (I):

Reaction (I)

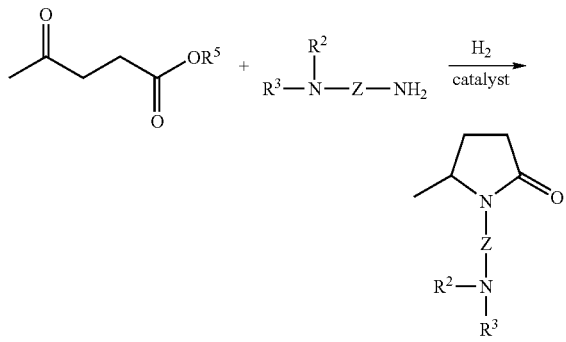

wherein:
(i) Z is —(CH$_2$)$_n$—, wherein n is an integer from 2 to 12;
(ii) R$^2$ and R$^3$ taken independently are H, —CH$_3$, —CH$_2$CH$_3$ or C$_3$ to C$_6$ straight-chain or branched monovalent alkyl; and
(iii) R$^5$ is H, —CH$_3$, —CH$_2$CH$_3$ or C$_3$ to C$_8$ straight-chain or branched monovalent alkyl.

In another embodiment, the pyrrolidine-2-one may be synthesized by contacting a salt of levulinic acid, such as ammonium levulinate, with a diamine of the Formula R$_2$R$^3$N-Z-NH$_2$ in the presence of hydrogen gas and a catalyst.

The pyrrolidine-2-one formed in Reaction (I) can be synthesized according to the methods and conditions taught in U.S. Pat. No. 6,818,593 (hereinafter to referred to as '593). Although '593 describes the synthesis of 5-methyl-N-alkyl-2-pyrrolidinone from the reductive amination of levulinic acid with nitro compounds, the methods and conditions taught in '593 (column 2, line 66 through column 7, line 21) can be utilized for the process described by Reaction (I) wherein levulinic acid, a salt thereof, or an ester thereof and a diamine are converted to a pyrrolidine-2-one in the presence of hydrogen gas and a catalyst.

Levulinic acid may be obtained from biomass. For the conversion of biomass to levulinic acid, biomass may be contacted with water and an acid catalyst in a train of one or more reactors, preferably under pressure at elevated temperature. This basic process is described, for example, in U.S. Pat. Nos. 5,608,105, 5,859,263, 6,054,611 and U.S. patent application Ser. No. 2003/0233011. Generally, cellulose in the biomass is converted to levulinic acid and formate in one or more reactors. Levulinic acid produced from biomass may also be converted to levulinic acid esters for example as described in U.S. 2003/0233011A1 through the reaction of levulinic acid with olefins.

For the synthesis of pyrrolidine-2-ones according to Reaction (I), a molar ratio of diamine to levulinic acid, a salt thereof, or an ester thereof of from about 0.01/1 to about 100/1 is preferred at the start of the reaction; a molar ratio of about 0.3/1 to about 5/1 is further preferred at the start of the reaction. A temperature range of from about 25 degrees C. to about 300 degrees C. is used for the reductive amination reaction; a temperature range of from about 75 degrees C. to about 200 degrees C. is preferred. A pressure range of from about 0.3 MPa to about 20.0 MPa is employed for the reaction; a pressure range of from about 1.3 MPa to about 7.6 MPa is preferred. The reaction may be performed in a non-reacting solvent medium such as water, alcohols, ethers, and pyrrolidones. Alternatively, the excess of diamine can also act as the medium of the reaction.

The principal component of the catalyst useful for Reaction (I) is selected from metals from the group consisting of palladium, ruthenium, rhenium, rhodium, iridium, platinum, nickel, cobalt, copper, iron, osmium; compounds thereof; and combinations thereof.

A chemical promoter may augment the activity of a catalyst. The promoter may be incorporated into the catalyst during any step in the chemical processing of the catalyst constituent. The chemical promoter generally enhances the physical or chemical function of the catalyst agent, but can also be added to retard undesirable side reactions. Suitable promoters useful to prepare the ionic liquid useful for the processes of the invention include metals selected from tin, zinc, copper, gold, silver, and combinations thereof. The preferred metal promoter is tin. Other promoters that can be used are elements selected from Group 1 and Group 2 of the Periodic Table.

The catalyst may be supported or unsupported. A supported catalyst is one in which the active catalyst agent is deposited on a support material by a number of methods, such as spraying, soaking or physical mixing, followed by drying, calcination, and if necessary, activation through methods such as reduction or oxidation. Materials frequently used as a support are porous solids with high total surface areas (external and internal) which can provide high concentrations of active sites per unit weight of catalyst. The catalyst support may enhance the function of the catalyst agent. A supported metal catalyst is a supported catalyst in which the catalyst agent is a metal.

A catalyst that is not supported on a catalyst support material is an unsupported catalyst. An unsupported catalyst may be platinum black or a Raney® (W. R. Grace & Co., Columbia, Md.) catalyst. Raney® catalysts have a high surface area due to selectively leaching an alloy containing the active metal(s) and a leachable metal (usually aluminum). Raney® catalysts have high activity due to the higher specific area and allow the use of lower temperatures in hydrogenation reactions. The active metals of Raney® catalysts include nickel, copper, cobalt, iron, rhodium, ruthenium, rhenium, osmium, iridium, platinum, palladium; compounds thereof; and combinations thereof.

Promoter metals may also be added to the base Raney® metals to affect selectivity and/or activity of the Raney® catalyst. Promoter metals for Raney® catalysts may be selected from transition metals from Groups IIIA through VIIIA, IB and IIB of the Periodic Table of the Elements. Examples of promoter metals include chromium, molybdenum, platinum, rhodium, ruthenium, osmium, and palladium, typically at about 2% by weight of the total metal.

The catalyst useful herein can be any solid, inert substance including, but not limited to, oxides such as silica, alumina and titania; barium sulfate; calcium carbonate; and carbons. The catalyst support can be in the form of powder, granules, pellets, or the like.

A preferred support material of the invention is selected from the group consisting of carbon, alumina, silica, silica-alumina, silica-titania, titania, titania-alumina, barium sulfate, calcium carbonate, strontium carbonate, compounds thereof and combinations thereof. Supported metal catalysts can also have supporting materials made from one or more compounds. More preferred supports are carbon, titania and alumina. Further preferred supports are carbons with a surface area greater than 100 m²/g. A further preferred support is carbon with a surface area greater than 200 m²/g. Preferably, the carbon has an ash content that is less than 5% by weight of the catalyst support; the ash content is the inorganic residue (expressed as a percentage of the original weight of the carbon) which remains after incineration of the carbon.

The preferred content of the metal catalyst in the supported catalyst is from about 0.1% to about 20% of the supported catalyst based on metal catalyst weight plus the support weight. A more preferred metal catalyst content range is from about 1% to about 10% of the supported catalyst.

Combinations of metal catalyst and support system may include any one of the metals referred to herein with any of the supports referred to herein. Preferred combinations of metal catalyst and support include palladium on carbon, palladium on calcium carbonate, palladium on barium sulfate, palladium on alumina, palladium on titania, platinum on carbon, platinum on alumina, platinum on silica, iridium on silica, iridium on carbon, iridium on alumina, rhodium on carbon, rhodium on silica, rhodium on alumina, nickel on carbon, nickel on alumina, nickel on silica, rhenium on carbon, rhenium on silica, rhenium on alumina, ruthenium on carbon, ruthenium on alumina and ruthenium on silica.

Further preferred combinations of metal catalyst and support include palladium on carbon, palladium on alumina, palladium on titania, platinum on carbon, platinum on alumina, rhodium on carbon, rhodium on alumina, ruthenium on carbon and ruthenium on alumina.

Suitable diamines for Reaction (I) may be obtained commercially from, for example, Huntsman (Houston, Tex.) or BASF (Mount Olive, N.J.), or may be synthesized by methods well known to those skilled in the art. For a discussion of the synthesis of diamines, see, for example, Eller, K. and Henkes, E., Diamines and Polyamines (Ullmanns Encyclopedia of Industrial Chemistry (2002) Wiley-VCH Verlag GmbH & Co, Chapter 8) and Experimental Methods in Organic Chemistry, 3$^{rd}$ Edition (Moore, J., Dalrymple, D. and Rodig, O. (eds.) (1982) Saunders College Publishing, NY, Chapter 22. Suitable diamines are those having the Formula $R_2R^3N$—Z—$NH_2$ wherein Z is —$(CH_2)_n$—, wherein n is an integer from 2 to 12 and $R^2$ and $R^3$ taken independently are H, —$CH_3$, —$CH_2CH_3$ or $C_3$ to $C_6$ straight-chain or branched monovalent alkyl.

The formation of pyrrolidine-2-ones may be carried out in batch, sequential batch (i.e., a series of batch reactors) or in continuous mode in any of the equipment customarily employed for continuous process (see for example, H. S. Fogler, Elementary Chemical Reaction Engineering, Prentice-Hall, Inc., N.J., USA).

The pyrrolidinones synthesized according to Reaction (I) may be recovered, for example, by distillation, or by filtration to remove solid acid catalyst particles if present.

Conversion of the Pyrrolidine-2-one to an Ionic Liquid

The non-ring nitrogen of the pyrrolidine-2-one is quaternized to obtain an ionic liquid of the Formula:

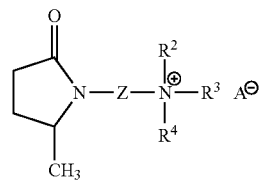

wherein Z is —$(CH_2)_n$— wherein n is an integer from 2 to 12, $R^2$, $R^3$, and $R^4$ taken independently are —$CH_3$, —$CH_2CH_3$ or $C_3$ to $C_6$ straight-chain or branched monovalent alkyl, and A- is selected from the group consisting of Cl⁻, Br⁻, and I⁻.

In order to form the ionic liquid, the pyrrolidine-2-one is contacted with an alkylating halide having the Formula $R^1$-A wherein $R^1$ is selected from the group consisting of —$CH_3$, —$CH_2CH_3$ or $C_3$ to $C_6$ straight-chain or branched monovalent alkyl, and A⁻ is selected from the group consisting of Cl⁻, Br⁻, and I⁻. Methods for performing quaternization reactions are well-known and are described in Organic Chemistry (Morrison and Boyd (ed.) 3$^{rd}$ Edition (1973) Allyn and Bacon, Inc., Boston, Chapter 23.5, pages 752-753).

The quaternization reaction may optionally be carried out in an inert solvent, such as acetonitrile, acetone or dichloromethane. The quaternization may be accomplished by refluxing of the reactants, optionally under an inert atmosphere. When the compositions of the present invention and/or the reactants used for synthesis of the compositions are hygroscopic, it is preferable to carry out the quaternization and/or anion exchange reaction (see below) under conditions that exclude water and air. The alkylating halide is present in slight excess (ca. 5%) at the start of the reaction. The reaction is carried out at a temperature of from about 10 degrees C. to about 80 degrees C.; the reaction is preferably carried out at a temperature of from about 30 degrees C. to about 70 degrees C., more preferably from about 60 degrees C. to about 70 degrees C. The time for the reaction is generally from about 1 minute to about 48 hours; the time for the reaction is preferably from about 30 minutes to about 24 hours.

Anion Exchange

The ionic liquid may be converted to a different ionic liquid suitable for the process of the invention by an anion exchange reaction. Thus, the quaternary ammonium compound (ionic liquid) is contacted with M⁺A⁻, wherein M is selected from the group consisting of H, Li, K, Na, Ag, Mg, Ca, Ce, Ba, Rb and Sr, and A⁻ is an anion as described earlier, to form a composition having the desired anion.

Prior to the exchange reaction, excess alkylating agent may be removed, for example, by evaporation. In addition, the quaternary ammonium compound may be washed with a solvent and dried prior to the anion exchange reaction. The anion exchange reaction may be carried out by mixing the quaternary ammonium compound with M⁺A⁻, optionally under an inert atmosphere. The anion exchange reaction may be carried out at a temperature of from about −20 degrees C. to about 100 degrees C. for a time of about 1 second to about 72 hours. Solvents useful in the reaction should be inert to the reactants and products, and include methanol, ethanol, acetone and acetonitrile. Choice of the appropriate solvent or mixture of solvents will allow for separation of the composition comprising the desired anion from the composition comprising the less desired anion as is well known in the art. Additional techniques may be utilized to enhance the anion exchange reaction, such as ultrasonication as taught in WO 03/048078.

The ionic liquid comprising the desired anion can be recovered by a suitable technique such as evaporation of the reaction solvent under reduced pressure, decantation and/or filtration to remove precipitated salts.

The physical and chemical properties of the ionic liquids useful for the present invention can be specifically selected by choice of the appropriate cation and anion. For example, increasing the chain length of one or more alkyl chains of the cation will affect properties such as the melting point, hydrophilicity/lipophilicity, density and salvation strength of the ionic liquid. Choice of the anion can affect, for example, the melting point, the water solubility and the acidity and coordination properties of the composition. Thus it may be desirable to perform an anion exchange reaction by contacting the composition with $M^+A^-$ as described above to replace a less desirable anion of an ionic liquid with an anion that gives the desired chemical and physical properties for the ionic liquid composition. Effects of cation and anion on the physical and chemical properties of ionic liquids are known to those skilled in the art and are reviewed in detail by Wassersheid and Keim (Angew. Chem. Int. Ed, supra) and Sheldon (Chem. Commun., supra). In the present invention, the choice of the ionic liquid will affect the length of the polymer that is formed, and thus the at least one ionic liquid is chosen so as to achieve a polymer with the desired Mn number.

An advantage to the use of at least one ionic liquid in this reaction is that the reaction product comprises a polyether glycol phase comprising poly(tetramethylene)glycol and an ionic liquid phase that comprises the acid catalyst. Thus the poly(tetramethylene)glycol product or products in the polyether glycol phase is/are easily recoverable from the ionic liquid phase by, for example, decantation. In a preferred embodiment, the separated ionic liquid phase is reused to form the reaction mixture.

GENERAL MATERIALS AND METHODS

The following abbreviations are used:

Nuclear magnetic resonance is abbreviated NMR; gas chromatography is abbreviated GC; gas chromatography-mass spectrometry is abbreviated GC-MS; thin layer chromatography is abbreviated TLC; thermogravimetric analysis (using a Universal V3.9A TA instrument analyser (TA Instruments, Inc., Newcastle, Del.)) is abbreviated TGA. Centigrade is abbreviated C, mega Pascal is abbreviated MPa, gram is abbreviated g, kilogram is abbreviated Kg, milliliter(s) is abbreviated ml(s), hour is abbreviated hr; weight percent is abbreviated wt %; milliequivalents is abbreviated meq; melting point is abbreviated Mp; differential scanning calorimetry is abbreviated DSC.

Tetrahydrofuran, iodopropane, acetonitrile, iodoperfluorohexane, toluene, 1,3-propanediol, oleum (20% $SO_3$), sodium sulfite ($Na_2SO_3$, 98%), and acetone were obtained from Acros (Hampton, N.H.). Potassium metabisulfite ($K_2S_2O_5$, 99%), was obtained from Mallinckrodt Laboratory Chemicals (Phillipsburg, N.J.). Potassium sulfite hydrate ($KHSO_3 \cdot xH_2O$, 95%), sodium bisulfite ($NaHSO_3$), sodium carbonate, magnesium sulfate, ethyl ether, trioctyl phosphine, and 1-ethyl-3-methylimidazolium chloride (98%) were obtained from Aldrich (St. Louis, Mo.). Sulfuric acid and methylene chloride were obtained from EMD Chemicals, Inc. (Gibbstown, N.J.). Perfluoro(ethylvinyl ether), perfluoro (methylvinyl ether), hexafluoropropene and tetrafluoroethylene were obtained from DuPont Fluoroproducts (Wilmington, Del.). 1-Butyl-methylimidazolium chloride was obtained from Fluka (Sigma-Aldrich, St. Louis, Mo.). Tetra-n-butylphosphonium bromide and tetradecyl(tri-n-hexyl) phosphonium chloride were obtained from Cytec Canada Inc. (Niagara Falls, Ontario, Canada). 1,1,2,2-Tetrafluoro-2-(pentafluoroethoxy)sulfonate was obtained from SynQuest Laboratories, Inc. (Alachua, Fla.).

Preparation of Anions Not Generally Available Commercially (A) Synthesis of Potassium 1,1,2,2-tetrafluoroethanesulfonate (TFES-K) ($[HCF_2CF_2SO_3]^-$)

A 1-gallon Hastelloy® C276 reaction vessel was charged with a solution of potassium sulfite hydrate (176 g, 1.0 mol), potassium metabisulfite (610 g, 2.8 mol) and deionized water (2000 ml). The pH of this solution was 5.8. The vessel was cooled to 18 degrees C., evacuated to 0.10 MPa, and purged with nitrogen. The evacuate/purge cycle was repeated two more times. To the vessel was then added tetrafluoroethylene (TFE, 66 g), and it was heated to 100 degrees C. at which time the inside pressure was 1.14 MPa. The reaction temperature was increased to 125 degrees C. and kept there for 3 hr. As the TFE pressure decreased due to the reaction, more TFE was added in small aliquots (20-30 g each) to maintain operating pressure roughly between 1.14 and 1.48 MPa. Once 500 g (5.0 mol) of TFE had been fed after the initial 66 g precharge, the vessel was vented and cooled to 25 degrees C. The pH of the clear light yellow reaction solution was 10-11. This solution was buffered to pH 7 through the addition of potassium metabisulfite (16 g).

The water was removed in vacuo on a rotary evaporator to produce a wet solid. The solid was then placed in a freeze dryer (Virtis Freezemobile 35xl; Gardiner, N.Y.) for 72 hr to reduce the water content to approximately 1.5 wt % (1387 g crude material). The theoretical mass of total solids was 1351 g. The mass balance was very close to ideal and the isolated solid had slightly higher mass due to moisture. This added freeze drying step had the advantage of producing a free-flowing white powder whereas treatment in a vacuum oven resulted in a soapy solid cake that was very difficult to remove and had to be chipped and broken out of the flask.

The crude TFES-K can be further purified and isolated by extraction with reagent grade acetone, filtration, and drying. $^{19}F$ NMR ($D_2O$) δ. —122.0.(dt, $J_{FH}$=6 Hz, $J_{FF}$=6 Hz, 2F); –136.1 (dt, $J_{FH}$=53 Hz, 2F). $^1H$ NMR ($D_2O$) δ 6.4 (tt, $J_{FH}$=53 Hz, $J_{FH}$=6 Hz, 1H). % Water by Karl-Fisher titration: 580 ppm.

Analytical calculation for $C_2HO_3F_4SK$: C, 10.9: H, 0.5: N, 0.0 Experimental results: C, 11.1: H, 0.7: N, 0.2. Mp (DSC): 242 degrees C.

TGA (air): 10% wt. loss @ 367 degrees C., 50% wt. loss @ 375 degrees C.

TGA ($N_2$): 10% wt. loss @ 363 degrees C., 50% wt. loss @ 375 degrees C.

(B) Synthesis of Potassium-1,1,2-trifluoro-2-(Perfluoroethoxy)Ethanesulfonate (TPES-K) ($[CF_3CF_2OCFHCF_2SO_3]^-$)

A 1-gallon Hastelloy® C276 reaction vessel was charged with a solution of potassium sulfite hydrate (88 g, 0.56 mol), potassium metabisulfite (340 g, 1.53 mol) and deionized water (2000 ml). The vessel was cooled to 7 degrees C., evacuated to 0.05 MPa, and purged with nitrogen. The evacuate/purge cycle was repeated two more times. To the vessel was then added perfluoro(ethylvinyl ether) (PEVE, 600 g, 2.78 mol), and it was heated to 125 degrees C. at which time the inside pressure was 2.31 MPa. The reaction temperature was maintained at 125 degrees C. for 10 hr. The pressure dropped to 0.26 MPa at which point the vessel was vented and cooled to 25 degrees C. The crude reaction product was a white crystalline precipitate with a colorless aqueous layer (pH=7) above it.

The $^{19}$F NMR spectrum of the white solid showed pure desired product, while the spectrum of the aqueous layer showed a small but detectable amount of a fluorinated impurity. The desired isomer is less soluble in water so it precipitated in isomerically pure form.

The product slurry was suction filtered through a fritted glass funnel, and the wet cake was dried in a vacuum oven (60 degrees C., 0.01 MPa) for 48 hr. The product was obtained as off-white crystals (904 g, 97% yield).

$^{19}$F NMR (D$_2$O) δ −86.5.(s, 3F); −89.2, −91.3 (subsplit ABq, J$_{FF}$=147 Hz, 2F); −119.3, −121.2 (subsplit ABq, J$_{FF}$=258 Hz, 2F); −144.3 (dm, J$_{FH}$=53 Hz, 1F). $^1$H NMR (D$_2$O) δ 6.7 (dm, J$_{FH}$=53 Hz, 1H). Mp (DSC) 263 degrees C.

Analytical calculation for C$_4$HO$_4$F$_8$SK: C, 14.3: H, 0.3 Experimental results: C, 14.1: H, 0.3.

TGA (air): 10% wt. loss @ 359 degrees C., 50% wt. loss @ 367 degrees C.

TGA (N$_2$): 10% wt. loss @ 362 degrees C., 50% wt. loss @ 374 degrees C.

(C) Synthesis of Potassium-1,1,2-trifluoro-2-(Trifluoromethoxy)Ethanesulfonate (TTES-K) ([CF$_3$OCFHCF$_2$SO$_3$]$^−$):

A 1-gallon Hastelloy® C276 reaction vessel was charged with a solution of potassium sulfite hydrate (114 g, 0.72 mol), potassium metabisulfite (440 g, 1.98 mol) and deionized water (2000 ml). The pH of this solution was 5.8. The vessel was cooled to −35 degrees C., evacuated to 0.08 MPa, and purged with nitrogen. The evacuate/purge cycle was repeated two more times. To the vessel was then added perfluoro(methylvinyl ether) (PMVE, 600 g, 3.61 mol) and it was heated to 125 degrees C. at which time the inside pressure was 3.29 MPa. The reaction temperature was maintained at 125 degrees C. for 6 hr. The pressure dropped to 0.27 MPa at which point the vessel was vented and cooled to 25 degrees C. Once cooled, a white crystalline precipitate of the desired product formed leaving a colorless clear aqueous solution above it (pH=7).

The $^{19}$F NMR spectrum of the white solid showed pure desired product, while the spectrum of the aqueous layer showed a small but detectable amount of a fluorinated impurity.

The solution was suction filtered through a fritted glass funnel for 6 hr to remove most of the water. The wet cake was then dried in a vacuum oven at 0.01 MPa and 50 degrees C. for 48 hr. This gave 854 g (83% yield) of a white powder. The final product was isomerically pure (by $^{19}$F and $^1$H NMR) since the undesired isomer remained in the water during filtration.

$^{19}$F NMR (D$_2$O) δ −59.9.(d, J$_{FH}$=4 Hz, 3F); −119.6, −120.2 (subsplit ABq, J=260 Hz, 2F); −144.9 (dm, J$_{FH}$=53 Hz, 1F). $^1$H NMR (D$_2$O) δ 6.6 (dm, J$_{FH}$=53 Hz, 1H). % Water by Karl-Fisher titration: 71 ppm.

Analytical calculation for C$_3$HF$_6$SO$_4$K: C, 12.6: H, 0.4: N, 0.0 Experimental results: C, 12.6: H, 0.0: N, 0.1. Mp (DSC) 257 degrees C.

TGA (air): 10% wt. loss @ 343 degrees C., 50% wt. loss @ 358 degrees C.

TGA (N$_2$): 10% wt. loss @ 341 degrees C., 50% wt. loss @ 357 degrees C.

(D) Synthesis of Sodium 1,1,2,3,3,3-hexafluoropropanesulfonate (HFPS-Na) ([CF$_3$HFCCF$_2$SO$_3$]$^−$)

A 1-gallon Hastelloy® C reaction vessel was charged with a solution of anhydrous sodium sulfite (25 g, 0.20 mol), sodium bisulfite 73 g, (0.70 mol) and of deionized water (400 ml). The pH of this solution was 5.7. The vessel was cooled to 4 degrees C., evacuated to 0.08 MPa, and then charged with hexafluoropropene (HFP, 120 g, 0.8 mol, 0.43 MPa). The vessel was heated with agitation to 120 degrees C. and kept there for 3 hr. The pressure rose to a maximum of 1.83 MPa and then dropped down to 0.27 MPa within 30 minutes. At the end, the vessel was cooled and the remaining HFP was vented, and the reactor was purged with nitrogen. The final solution had a pH of 7.3.

The water was removed in vacuo on a rotary evaporator to produce a wet solid. The solid was then placed in a vacuum oven (0.02 MPa, 140 degrees C., 48 hr) to produce 219 g of white solid which contained approximately 1 wt % water. The theoretical mass of total solids was 217 g.

The crude HFPS-Na can be further purified and isolated by extraction with reagent grade acetone, filtration, and drying.

$^{19}$F NMR (D$_2$O) δ −74.5 (m, 3F); −113.1, −120.4 (ABq, J=264 Hz, 2F); −211.6 (dm, 1F). $^1$H NMR (D$_2$O) δ 5.8 (dm, J$_{FH}$=43 Hz, 1H). Mp (DSC) 126 degrees C.

TGA (air): 10% wt. loss @ 326 degrees C., 50% wt. loss @ 446 degrees C.

TGA (N$_2$): 10% wt. loss @ 322 degrees C., 50% wt. loss @ 449 degrees C.

Synthesis of the Ionic Liquid 1-(2-N,N-dimethylpentylaminoethyl)-5-methyl Pyrrolidine-2-one 1,1,2,2-tetrafluoroethanesulfonate Ethyl levulinate (18.5 g), N,N-dimethylethylenediamine (11.3 g), and 5% Pd/C (ESCAT-142, 1.0 g) were mixed in a 400 ml shaker tube reactor. The reaction was carried out at 150 degrees C. for 8 hr under 6.9 MPa of H$_2$.

The reactants and products were analyzed by gas chromatography on a HP-6890 GC (Agilent Technologies; Palo Alto, Calif.) and HP-5972A GC-MS detector equipped with a 25 M×0.25 MM ID CP-Wax 58 (FFAP) column. The GC yields were obtained by adding methoxyethyl ether as the internal standard. The ethyl levulinate conversion was 99.7%, and the product selectivity for 1-(2-N,N-dimethylaminoethyl)-5-methyl-pyrrolidine-2-one was 98.6%.

For the quaternization reaction, purified 1-(2-N,N-dimethylaminoethyl)-5-methyl-pyrrolidine-2-one (1.7 g) was placed in 5 g of dry acetonitrile, and 1.69 g of 1-iodopentane was added. This mixture was refluxed overnight under a nitrogen atmosphere; the reaction was shown to be complete via TLC, yielding the iodide salt of the quaternary ammonium compound. The acetonitrile was then removed under vacuum.

The ionic liquid 1-(2-N,N,N-dimethylpentylaminoethyl)-5-methyl pyrrolidine-2-one 1,1,2,2-tetrafluoroethanesulfonic acid is prepared by reacting 1-(2-N,N,N-dimethylpentylaminoethyl)-5-methyl pyrrolidine-2-one with 1,1,2,2-tetrafluoroethanesulfonate. 1-(2-N,N,N-Dimethylpentylaminoethyl)-5-methyl pyrrolidine-2-one (26.0 g) is mixed with reagent-grade acetone (250 ml), and an equimolar amount of potassium 1,1,2,2-tetrafluoroethanesulfonate (TFES-K, 26.6 g, 0.121 moles) is added. The large flask is lowered into an oil bath and heated at 60 degrees C. under reflux for 10 hours. The reaction mixture is then filtered using a large frit glass funnel to remove the white KCl precipitate formed, and the filtrate is placed on a rotary evaporator for 4 hours to remove the acetone. The product is isolated and dried under vacuum at 150 degrees C. for 2 days.

EXAMPLE 1

Polymerization of Tetrahyrofuran (THF)

1,1,2,2-Tetrafluoroethanesulfonic acid (5 mls) is contacted with 250 mls of THF followed by acetic anhydride (15 g) in a nitrogen flushed flask. The ionic liquid 1-(2-N,N,N-dimethylpentylaminoethyl)-5-methyl-pyrrolidine 1,1,2,2-tetrafluoroethanesulfonate is added. The reaction is left at 45 C for up 4 hours. Upon phase separation the polytetrahydrofuran phase is separated from the ionic liquid/catalyst phase by decantation. The molecular weight (Mn) is in the region of 500-3000 Daltons.

The invention claimed is:

1. A process for preparing poly(tetramethylene)glycol comprising:
A) forming a reaction mixture comprising (1) tetrahydrofuran, (2) at least one catalyst, (3) at least one accelerator and (4) at least one ionic liquid comprised of an ammonium cation and an anion having the Formula:

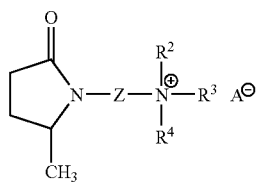

wherein:
(i) Z is —$(CH_2)_n$—, wherein n is an integer from 2 to 12;
(ii) $R^2$, $R^3$ and $R^4$ taken independently are H, —$CH_3$, —$CH_2CH_3$ or $C_3$ to $C_6$ straight-chain or branched monovalent alkyl; and
(iii) $A^-$ is $R^5$—$SO_3^-$ or $(R^6$—$SO_2)_2N^-$; wherein $R^5$ and $R^6$ are independently selected from the group consisting of:
(a) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
(b) —$CH_3$, —$C_2H_5$, or $C_3$ to $C_{25}$ straight-chain, branched or cyclic alkane or alkene comprising one to three heteroatoms selected from the group consisting of O, N and S, and optionally substituted with at least one member selected from the group consisting of Cl, Br, F, I, OH, $NH_2$ and SH;
(c) $C_6$ to $C_{25}$ unsubstituted aryl or unsubstituted heteroaryl having one to three heteroatoms independently selected from the group consisting of O, N and S; and
(d) $C_6$ to $C_{25}$ substituted aryl or substituted heteroaryl having one to three heteroatoms independently selected from the group consisting of O, N and S; and wherein said substituted aryl or substituted heteroaryl has one to three substituents independently selected from the group consisting of:
(1) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH,
(2) OH,
(3) $NH_2$, and
(4) SH;
at a temperature of from about 0 degrees C. to about 75 degrees C.; thereby forming a polyether glycol phase comprising poly(tetramethylene) glycol and an ionic liquid phase that comprises at least one catalyst; and
B) separating the polyether glycol phase from the ionic liquid phase comprising the at least one catalyst, thereby forming a separated ionic liquid phase.

2. The process of claim 1 wherein $A^-$ is selected from the group consisting of $[CH_3SOO_3]^-$, $[C_2H_5OSO_3]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2SO_3]^-$, and $[(CF_2HCF_2SO_2)_2N]^-$, $[(CF_3CFHCF_2SO_2)_2N]^-$.

3. The process of claim 1 wherein n is an integer from 2 to 6.

4. The process of claim 2 wherein n is an integer from 2 to 6.

5. The process of claim 1 wherein said at least one catalyst is a homogeneous acid catalyst having a pKa of less than about 4.

6. The process of claim 5 wherein said at least one catalyst is a homogeneous acid catalyst having a pKa of less than about 2.

7. The process of claim 5 wherein said at least one catalyst is a homogeneous acid catalyst selected from the group consisting of inorganic acids, organic sulfonic acids, heteropolyacids, fluoroalkyl sulfonic acids, metal sulfonates, metal trifluoroacetates, compounds thereof and combinations thereof.

8. The process of claim 5 wherein said at least one catalyst is a homogeneous acid catalyst selected from the group consisting of sulfuric acid, fluorosulfonic acid, p-toluenesulfonic acid, phosphotungstic acid, phosphomolybdic acid, trifluoromethanesulfonic acid, nonafluorobutanesulfonic acid, 1,1,2,2-tetrafluoroethanesulfonic acid, 1,1,2,3,3,3-hexafluoropropanesulfonic acid, bismuth triflate, yttrium triflate, ytterbium triflate, neodymium triflate, lanthanum triflate, scandium triflate, and zirconium triflate.

9. The process of claim 1 wherein the catalyst is used at a concentration of from about 0.1% to about 20% by weight of the tetrahydrofuran reactant.

10. The process of claim 1 wherein said accelerator is selected from the group consisting of carboxylic anhydrides, acyl halides, and carboxylic acids with a $pK_a$ of less than about 6 in water.

11. The process of claim 10 wherein said accelerator is selected from the group consisting of acetic anhydride, trifluoroacetic anhydride, acetyl chloride, acetic acid, trifluoroacetic acid, formic acid, cyanoacetic acid, nitropropionic acid, acrylic acid and methacrylic acid.

12. The process of claim 1 wherein the separated ionic liquid phase is reused to form the reaction mixture.

13. The process of claim 1 wherein the poly(tetramethylene)glycol has a number average molecular weight of from about 400 to about 20,000.

* * * * *